United States Patent [19]
Ricke et al.

[11] Patent Number: 5,547,695
[45] Date of Patent: Aug. 20, 1996

[54] METHOD OF FORMING DOUGH INTO DESIRED CONFIGURATIONS

[75] Inventors: Roy R. Ricke, Eagan, Minn.; Connie K. Beisner, Salina, Kans.

[73] Assignee: Schwan's Sales Enterprises, Inc., Marshall, Minn.

[21] Appl. No.: 322,251

[22] Filed: Oct. 13, 1994

[51] Int. Cl.⁶ .................................... A21D 6/00
[52] U.S. Cl. ...................... 426/496; 426/503; 426/512
[58] Field of Search ........................ 426/496, 502, 426/503, 512; 425/142, 296, 298, 315

[56] References Cited

U.S. PATENT DOCUMENTS

| | | | |
|---|---|---|---|
| 1,270,875 | 7/1918 | Rodman | 426/496 |
| 1,578,761 | 3/1926 | Rondolin | 426/503 |
| 3,203,368 | 8/1965 | Cooper et al. | 426/391 |
| 3,379,141 | 4/1968 | Groth | 426/503 |
| 4,303,677 | 12/1981 | De Acetis | 426/27 |
| 4,551,337 | 11/1985 | Schmit et al. | 426/94 |
| 4,606,923 | 8/1986 | Ricke | 426/496 |
| 4,842,882 | 6/1989 | Paulucci | 426/439 |
| 5,006,358 | 4/1991 | Rubio et al. | 426/496 |
| 5,074,778 | 12/1991 | Bette, Jr. et al. | 425/394 |
| 5,149,594 | 9/1992 | Lewandowski et al. | 426/503 |
| 5,204,125 | 4/1993 | Larsen | 425/298 |

*Primary Examiner*—George Yeung
*Attorney, Agent, or Firm*—Merchant, Gould, Smith, Edell, Welter & Schmidt, P.A.

[57] ABSTRACT

The present invention provides improved methods and apparatus for forming dough into a desired configuration. A sheet of dough travels on a continuous conveyor across a relatively rigid support surface and beneath a dough forming element. Air is forced into an upper chamber in a pneumatic cylinder to drive the dough forming element downward into contact with the dough. The dough is cut, and a portion of the cut dough is forced upward and into contact with heated protrusions on the dough forming element, which deactivate yeast in the dough. The dough forming element moves downstream together with the conveyor while the dough is being cut and formed. Air is forced into a lower chamber in the pneumatic cylinder to drive the dough forming element upward out of contact with the dough. A portion of the air forced into the lower chamber is channeled to an interface between the dough forming element and the cut and formed dough.

25 Claims, 4 Drawing Sheets

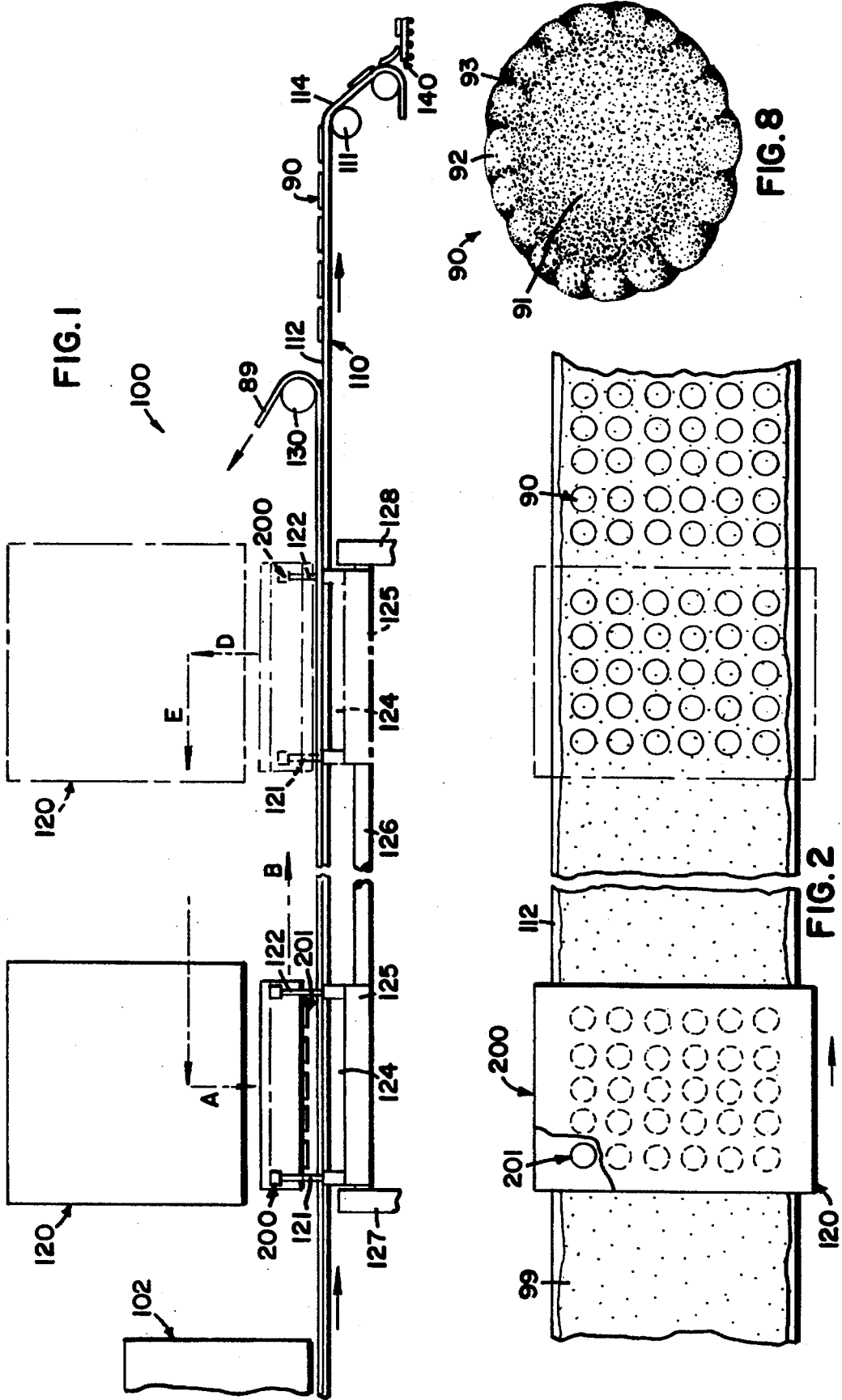

METHOD OF FORMING DOUGH INTO DESIRED CONFIGURATIONS

FIELD OF THE INVENTION

The present invention relates to the formation of dough into commercial quantities of desired configurations.

BACKGROUND OF THE INVENTION

Dough based products have been made in commercial quantities for quite some time, and numerous method and apparatus improvements have been introduced along the way. However, the desire for better production techniques continues unabated. For example, all other things remaining constant, the per unit cost of a product decreases in proportion to an increase in the speed with which the dough is made and manipulated into the product. Thus, there exists a need to move the dough as fast as possible through all of the necessary stages of dough formation.

All other things remaining constant, the per unit cost of a product decreases in proportion to a decrease in the cost of obtaining and operating the equipment with which the dough is made and manipulated into the product. Thus, there exists a need for dough forming equipment that is relatively less expensive to obtain and/or operate.

All other things remaining constant, the per unit cost of a product decreases in proportion to a decrease in the difficulty with which the dough is made and manipulated into the product. Thus, there exists a need for methods and apparatus that make it relatively easier to form dough into a desired configuration. In addition to cutting costs, there exists an ongoing need to maintain and/or improve the quality of the product, as well.

SUMMARY OF THE INVENTION

One aspect of the present invention is to form dough into a desired configuration according to the following steps: (a) positioning the dough on a surface beneath a dough forming element; (b) heating downwardly extending protrusions on the dough forming element to a temperature sufficiently high to deactivate yeast in the dough upon contact therewith; (c) moving the dough forming element downward into contact with the dough and thereby causing some portions of the dough to rise above other portions of the dough and into contact with the downwardly extending protrusions; and (d) moving the dough forming element upward out of contact with the formed dough. The heated protrusions form depressions in the desired higher portions of the dough and deactivate the yeast in the dough bordering these depressions prior to baking. In addition to enhancing the structural integrity of the desired dough configuration, these relatively hardened regions of dough provide a certain texture or crispness to the finished product that many people find pleasant. The introduction of heat near the interface between the dough forming element and the dough also reduces the likelihood of dough sticking to the dough forming element.

Another aspect of the present invention is to form dough into a desired configuration according to the following steps: (a) positioning the dough on a surface beneath a dough forming element that is connected to a piston within a pneumatic cylinder; (b) forcing pressurized air into the cylinder above the piston to move the dough forming element downward into contact with the dough; (c) forcing pressurized air into the cylinder below the piston to move the dough forming element upward out of contact with the dough; and (d) channeling or diverting a portion of the pressurized air forced into the cylinder below the piston to an interface between the dough forming element and the dough. The pressurized air reduces the likelihood of dough sticking to the dough forming element, and the manner in which the pressurized air is channeled to the interface between the dough forming element and the dough makes efficient use of components that are necessary for other phases of the dough forming process.

Yet another aspect of the present invention is to form dough into a desired configuration according to the following steps: (a) conveying the dough on a conveyor surface that moves continuously at a substantially constant rate beneath a dough forming element; (b) moving the dough forming element downward into contact with the dough; (c) moving the dough forming element downstream together with the conveyor surface; (d) moving the dough forming element upward out of contact with the formed dough; and (e) returning the dough forming element upstream relative to the conveyor surface. By definition, the continuous conveyor eliminates stopping and restarting of the dough movement between dough forming phases, thereby facilitating such movement and requiring less complicated conveyance equipment.

A preferred embodiment of the present invention performs all three of the dough forming methods discussed above to form dough into circular pizza crusts having a raised circumferential ridge or lip. The apparatus includes a continuous conveyor having a substantially flat upper surface that supports a sheet of dough. A table having a substantially flat and rigid support surface is disposed beneath the continuous conveyor. An annular cutting element is disposed above the support surface and the upper surface on the continuous conveyor. A cylindrical press head is also disposed above the support surface and the upper surface on the continuous conveyor. The press head is nested concentrically relative to the cutting element, and an annular space is defined between an inner diameter edge of the cutting element and an outer diameter edge of the press head.

Fins are integrally joined to the cutting element and extend into the annular space between the cutting element and the press head. A band heater is connected to the press head and heats the fins by convection to a temperature sufficiently high to deactivate yeast in the dough. A pneumatic cylinder assembly moves the cutting element between a first position spaced a distance above the upper surface on the continuous conveyor, and a second position adjacent the upper surface. When in the second position, the cutting element effectively engages the upper surface and cuts out a circle of dough, while the fins remain spaced a distance above the upper surface.

Another pneumatic cylinder assembly moves the press head between a first position spaced a first distance above the upper surface on the continuous conveyor, and a second position spaced a second, relatively shorter distance above the upper surface. When in the second position, the press head contacts the circle of dough and forces some of the dough within the cutting element up into the annular space. The fins extend into some of the dough forced up into the annular space and form annealed slits in the dough they contact.

The pneumatic cylinder assembly for the press head includes a piston movably disposed within a cylinder and dividing the cylinder into an upper chamber and a lower chamber. A shaft interconnects the press head and the piston, and a passage in the shaft joins a passage in the press head to place the lower chamber in fluid communication with a resilient plug that is nested in the press head proximate a dough engaging surface on the press head. The plug and the opening in the press head that receives the plug have lower portions that are shaped substantially like the bottom half of a right circular cone. Passages in the plug extend from the passage in the press head to locations about the side wall of the plug just above the cone-shaped lower portions.

A source of pressurized air is placed in selective fluid communication with the upper chamber and the lower chamber. The pressurized air is forced into the upper chamber to move the press head to the second position, and the pressurized air is forced into the lower chamber to move the press head to the first position. A portion of the pressurized air forced into the lower chamber escapes through the passages in the shaft and the press head and blows the dough away from the press head as the press head moves from the second position toward the first position.

The support surface, the cutting element, the press head, and the associated pneumatic cylinders are all mounted on a common set of linear bearings. When the cutting element is moved to the second position, the entire bearing mounted assembly travels together with the continuous conveyor. The pneumatic cylinder for the cutting element moves the press head down and up, as well. When the cutting element is in its first position, the press head is in a third position spaced a third, relatively longer distance from the upper surface. Once the cutting element is in its second position, the press head pneumatic cylinder moves the press head between its first and second positions, down and up relative to the cutting element.

The present invention may be further appreciated in view of the more detailed description of the preferred embodiment that follows.

BRIEF DESCRIPTION OF THE DRAWING

With reference to the Figures, wherein like numerals represent like parts and assemblies throughout the several views, FIG. 1 is a diagrammatic side view of a preferred embodiment dough forming system constructed according to the principles of the present invention;

FIG. 2 is a diagrammatic top view of the dough forming system shown in FIG. 1;

FIG. 8 is an isometric view of a pizza crust formed by the dough forming system shown in FIG. 1.

DETAILED DESCRIPTION OF A PREFERRED EMBODIMENT

Figures 3, 4:
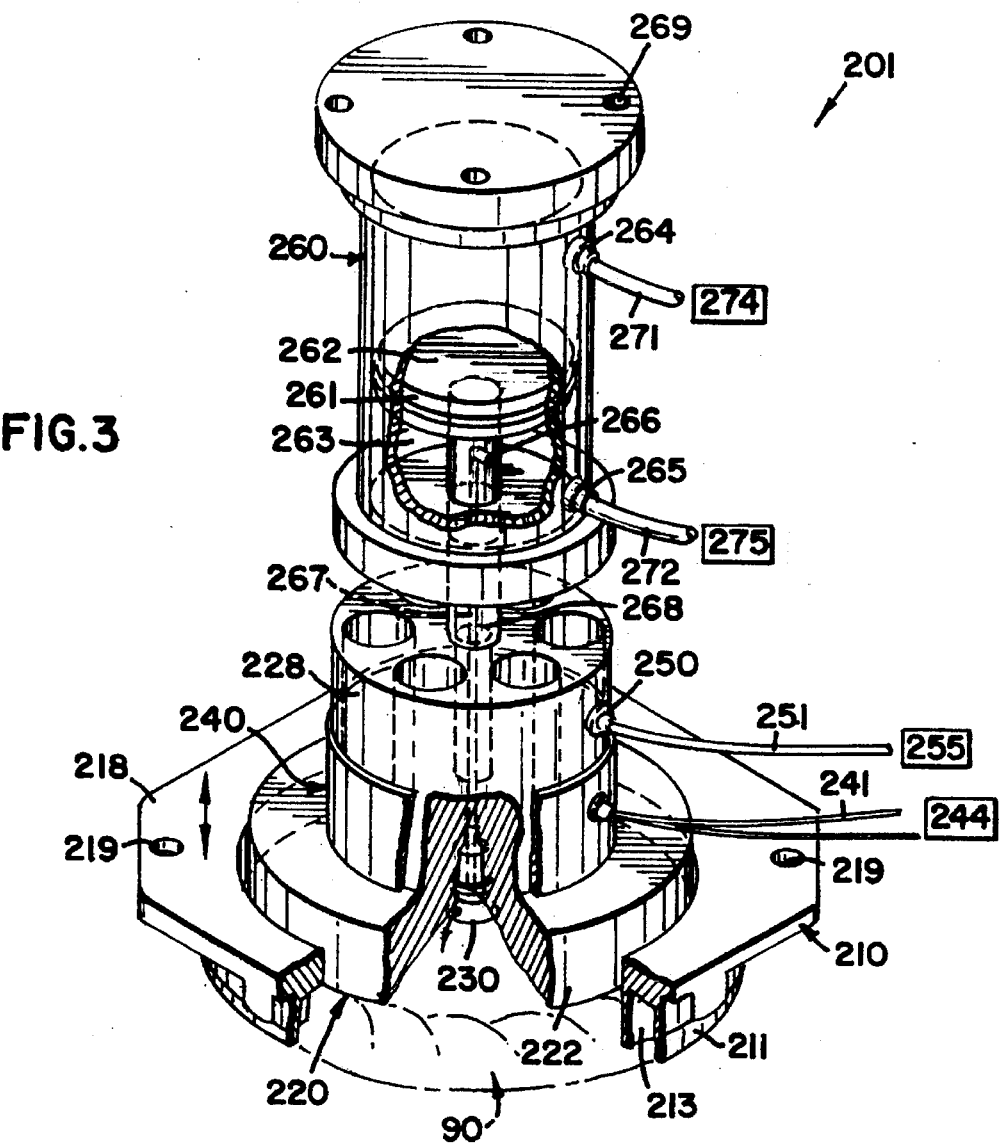
FIG. 3 is an isometric view of a dough forming element that is part of the dough forming system shown in FIG. 1.
FIG. 4 is an isometric view of an air channeling plug that is part of the dough forming element shown in FIG. 3.

A preferred embodiment dough forming apparatus or system constructed according to the principles of the present invention is designated as 100 in FIGS. 1-2. A conveyor belt 110 is supported on rollers 111 and extends from a dough source 102 to a product receptacle 140. The dough source 102 deposits a sheet of dough 99 of substantially uniform thickness onto an upper surface 112 on the conveyor 110. The sheet of dough 99 is conveyed across an upwardly facing, substantially flat support surface on a table 124 and beneath an array 200 of dough forming elements 201. The dough forming elements 201, as well as a control panel 120 for the dough forming elements, are supported by four pneumatic cylinders, two of which are designated as 121 and 122 in FIG. 1. The pneumatic cylinders extend vertically from the configuration of dough forming elements 201 to a base 125. The table 124 is also secured on the base 125, which in turn, is slidably mounted on a linear bearing assembly 126 that extends horizontally between support legs 127 and 128 shown in FIG. 1.

The dough forming elements 201 engage the sheet of dough 99 and cut circular pizza crusts 90 in the sheet. Scrap dough 89 is interspersed among the circular pizza crusts 90 and is directed onto a roller 130 that returns the scrap dough 89 to the dough source 102 for recycling. The crusts 90 are then conveyed passed a proofing station and down an incline 114 to the receptacle 140, which supports the circular crusts 90 during baking.

One of the dough forming elements 201 is shown in detail in FIG. 3. The dough forming element 201 generally includes a cutting element or ring 210, a press head 220, an air channeling plug 230, a band heater 240, a thermocouple 250, and a pneumatic cylinder 260. The cutting element 210 and the press head 220 are also shown in relation to one another in FIGS. 5 and 6. The cutting element 210 is metallic includes an annular wall 211 extending substantially perpendicularly from a base 218. The annular wall 211 forms a closed curve and thus, may be said to be circuital. A circular opening is formed through the cutting element 210 and bordered by a circular edge 12.

Figure 7:
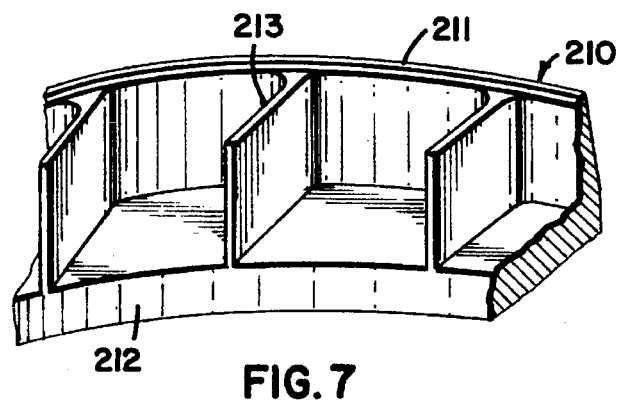
FIG. 7 is an isometric view of a portion of a cutting element that is part of the dough forming element shown in FIG. 3.

Eighteen fins 213 are integrally joined to and extend from the annular wall 211 to the circular edge 212. As shown in FIG. 7, the fins 213 also extend substantially perpendicularly from the base 218 but not as great a distance as the annular wall 211. Each fin 213 extends in a direction substantially toward an inwardmost point on a fin 213 disposed five fins away in a counterclockwise direction. In other words, each fin 213 defines an angle of approximately 135 degrees relative to a radius of the annular wall 211 extending to an inwardmost point on the fin 213. Recognizing that the fins 213 extend other than radially between the annular wall 211 and the inner edge 212, the fins 213 may be said to be longer than the radial distance between the annular wall 211 and the inner edge 212. Holes 219 are formed through the base 218 to facilitate mounting of the cutting element 210 relative to support structure in such a manner that the fins 213 may be said to be downwardly extending protrusions relative to the base 218.

Figure 5:
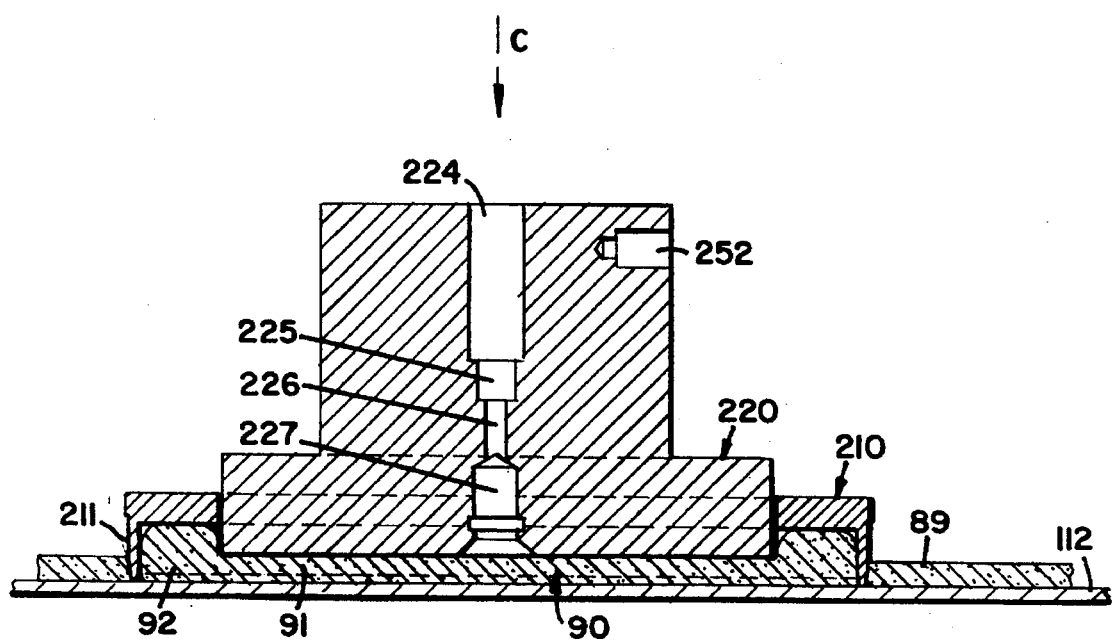
FIG. 5 is a sectioned side view of a portion of the dough forming element shown in FIG. 3.
Figure 6:
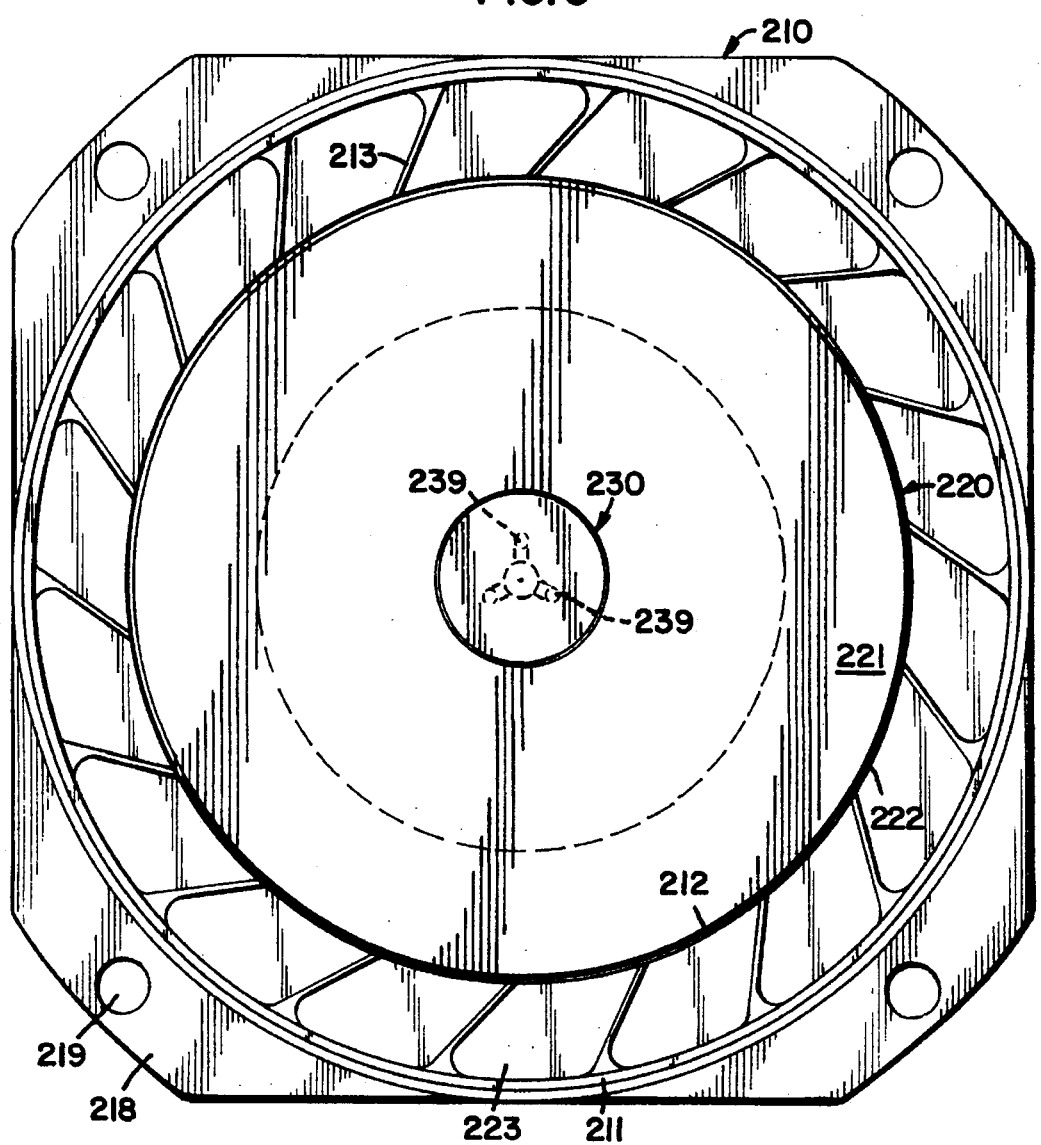
FIG. 6 is a bottom view of the dough forming element shown in FIG. 3.

The press head 220 is metallic and cylindrical in shape. The press head 220 includes a bottom surface 221 and a cylindrical side wall 222, which is slightly less in diameter than the circular edge on the cutting element 210. The press head 220 is concentrically nested within the cutting element 210, and the side wall 222 and the annular wall 211 cooperate to define an annular space 223 therebetween. As shown in FIG. 5, a series of axially aligned openings or bores are formed through the press head 220 from top to bottom. A first bore 224 receives a shaft, and a second bore 225 receives a threaded end of the shaft. A third bore 226 extends between the second bore 225 and a fourth opening 227, which receives and retains the air channeling plug 230.

An additional, radially oriented opening 252 is formed in a relatively smaller diameter cylindrical side wall 228 on the press head 220 to receive and retain the thermocouple 250.

As shown in FIG. 4, the air channeling plug 230 is similar in size and configuration to the opening 227 in the press head 220. In particular, the plug 230 extends from a cone-shaped top 234, to a first cylindrical portion 231, to a relatively larger diameter, second cylindrical portion 232 to a relatively smaller diameter, third cylindrical portion 236, to a cone-shaped base 233. The second cylindrical portion 232 effectively secures the plug 230 within the press head opening 227. A passage 237 extends through the top and the three cylindrical portions of the plug 230 and branches into three smaller passages that terminate in holes 239 disposed about the circumference of the third cylindrical portion 236.

With reference back to FIG. 3, the band heater 240 is disposed about the relatively smaller diameter side wall 228 on the press head 220. The band heater 240 is connected to a source 244 of 220 V electricity proximate the control panel 120 by means of wires 241. A thermocouple 250 is secured within the opening 252 in the side wall 228 and is connected to the control panel 120 by means of wire 251. The thermocouple 250 provides data useful in controlling operation of the band heater 240 so that the temperature of the press head remains in the approximate range of 150–165 degrees fahrenheit, and the temperature of the fins 213 remains in the approximate range of 120–135 degrees fahrenheit.

A pneumatic cylinder 260 is disposed above the press head 220 and connected thereto by means of a rod or shaft 268. The rod 268 extends into the cylinder 260 and joins a piston 261, which effectively divides the cylinder 260 into an upper compartment 262 and a lower compartment 263. An upper port 264 on the cylinder 260 is placed in fluid communication with a source of pressurized air 274 by means of a hose 271. The air source 274 and the hose 271 cooperate with the upper port 264 to selectively force pressurized air into the upper compartment 262. A lower port 265 on the cylinder 260 is placed in fluid communication with a source of pressurized air 275 by means of a hose 272. The air source 275 and the hose 272 cooperate with the upper port 265 to selectively force pressurized air into the lower compartment 263. A radially directed hole 266 in the rod 268 places the lower compartment 263 in fluid communication with a bore 267 in the rod 268. The bore or passage 267 extends to the bottom of the rod 268 and continues through the shaft associated with the openings 224–225 in the press head 220. Holes 269 are formed into the top of the cylinder 260 to facilitate mounting thereof relative to support structure.

In operation, the conveyor 110 moves continuously at a substantially constant rate from the dough source 102 to the crust drop-off 114. Each dough forming iteration begins with the array 200 of dough forming elements 201 in the position shown in solid lines in FIG. 1. At an appropriate time interval, which is a function of the speed of the conveyor and the size of the array 200, the array moves in the direction designated by the arrow A, downward toward the sheet of dough 99, the conveyor 110, and the table 124. The array 200 then moves in the direction designated by the arrow B, downstream together with and at the same rate as the conveyor 110 and the dough 99. The table 124 is supported on the same linear bearing assembly as the array 200 and thus, moves downstream together with the array 200. The annular wall 211 on each cutting element 210 penetrates the dough 99 and thereby forms a dough circle 90 within the confines of the annular wall 211. The table 124 supports the conveyor 110 and the dough 99 from below during this cutting step.

While the array 200 and the table 124 continue to move downstream with the conveyor 110 and the dough 99, pressurized air is forced into the upper chamber 262 to move the press head 220 in the direction designated by the arrow C in FIG. 5, downward relative to the cutting element 210 and toward a respective circle of dough 90, the conveyor 110 and the table 124. The bottom surface 221 on the press head 220 contacts the circle of dough 90 and forces it downward and outward around the press head 220 and upward in the annular space 223 and between the fins 213. The dough that remains beneath the press head 220 is pressed into a relatively thinner disc 91, and the dough that is forced into the annular space 223 forms a relatively thicker ridge or lip 92. The fins 213 deactivate the yeast in the dough that they contact and thereby form skinned slits 93 in the dough circle 90, which function to maintain the structural integrity and contribute to the texture of the lip 92.

As the array 200 approaches the position shown in phantom lines in FIG. 1, pressurized air is forced into the lower chamber 263 to move the press head 220 in a direction opposite to that designated as C in FIG. 5, upward relative to the cutting element 210 and away from the conveyor 110, the circle of dough 90, and the table 124. A portion of the pressurized air is channeled or diverted through the hole 266 and down through a passageway to the plug 230. The air in the lower chamber 263 is pressurized beyond a threshold level sufficient to resiliently deform the plug 230, and the pressurized air escapes between the base 233 of the plug 230 and the walls of the opening 227 in the press head 220. The escaping air blows the dough 90 off the bottom surface 221 of the press head 220. When the pressure in the lower chamber 263 falls below the threshold level, the resilience of the plug 230 effectively seals the gap that opened between the base 233 and the walls of the opening 227. This blowing step makes efficient use of the pressurized air in the lower chamber 263 to reduce the likelihood of dough sticking to the press head 220 and/or cutting element 210 during separation from the dough circles 90 and scrap dough 89. The heating of the fins 213 facilitates clean separation, as well.

Substantially contemporaneously with the upward movement of the press head 220 relative to the cutting element 210, the array 200 moves in a direction designated by the arrow D in FIG. 1, upward away from the conveyor 110, the dough circles 90 and scrap dough 89, and the table 124. The array 200 then moves in the direction designated by the arrow E, back upstream prior to the start of the next dough forming iteration. The lateral movement of the array 200 along the linear bearing assembly 126 allows the conveyor 110 to run continuously and thereby improves operating efficiency.

The present invention also provides a preferred method of forming dough into a desired configuration according to the following steps:

Dough is made and manipulated into a sheet.

The sheet of dough is placed on a conveyor surface that moves continuously at a substantially constant rate.

The sheet of dough is conveyed across a relatively rigid support surface and beneath a dough forming element.

A cutting element on the dough forming element is moved downward into contact with the sheet of dough and the conveyor surface beneath the sheet of dough.

The cutting element and the support surface are supported on linear bearings and moved downstream together with the conveyor surface.

Downwardly protruding fins on the cutting element are heated to a temperature sufficient to deactivate yeast in the dough with which the fins come into contact.

A press head on the dough forming element, which is nested within the cutting element, is moved downward into contact with the dough within the cutting element in order to force some of the dough upward about the sides of the press head and between the heated fins.

The cutting element and the press head are moved upward out of contact with the formed dough.

A portion of the pressurized air used to move the press head upward is channeled to the interface between the press head and the formed dough in order to blow the formed dough off the press head.

The cutting element, press head, and support surface are moved back upstream relative to the conveyor surface.

The dough surrounding the formed dough is removed from the conveyor surface.

The formed dough is conveyed to additional stations, including an oven.

Although the present invention has been described with reference to a preferred embodiment and a particular application, those skilled in the art will recognize additional embodiments and/or applications that fall within the scope of the present invention. For example, the present invention can be used to form dough into items other than pizza crusts, and to form dough into configurations other than circles having circumferential ridges. The present invention may also have applications outside the formation of dough for food products. Accordingly, the present invention is limited only to the extent of the claims that follow:

We claim:

1. A method of forming dough, comprising the steps of:
   positioning the dough on a surface beneath a dough forming element;
   heating downwardly extending protrusions on the dough forming element to a temperature sufficiently high to deactivate yeast in the dough upon contact therewith;
   moving the dough forming element downward into contact with the dough and thereby causing a portion of the dough to rise above another portion of the dough and between the downwardly extending protrusions; and
   moving the dough forming element upward out of contact with the formed dough.

2. A method according to claim 1, wherein the step of moving the dough forming element downward into contact with the dough causes a circumferential portion of the dough to rise above the other portion of the dough and between the downwardly extending protrusions.

3. A method according to claim 1, wherein the step of positioning the dough on the surface beneath the dough forming element involves conveying the dough on a conveyor surface.

4. A method according to claim 3, wherein a sheet of dough is conveyed on the conveyor surface, and the step of moving the dough forming element downward into contact with the dough also causes a desired portion of dough to be cut from the sheet of dough.

5. A method according to claim 4, further comprising the step of disposing a relatively rigid support surface beneath the dough forming element and the conveyor surface.

6. A method according to claim 3, wherein the conveyor surface moves continuously at a substantially constant rate, and further comprising the step of moving the dough forming element together with the conveyor surface between the steps of moving the dough forming element downward and upward relative to the conveyor surface.

7. A method according to claim 6, further comprising the step of disposing a relatively rigid support surface beneath the dough forming element and the conveyor surface.

8. A method according to claim 7, further comprising the step of moving the support surface together with the dough forming element and the conveyor surface between the steps of moving the dough forming element downward and upward relative to the conveyor surface.

9. A method according to claim 3, wherein a sheet of dough of substantially uniform thickness is conveyed on the conveyor surface, and the step of moving the dough forming element downward into contact with the dough involves the steps of:
   moving a cutting portion of the dough forming element downward substantially through the dough and into contact with the surface in order to cut a desired portion of dough from the sheet of dough; and
   moving a pressing portion of the dough forming element downward relative to the cutting portion and against the desired portion of dough in order to force a portion of the desired portion of dough to rise above another portion of the desired portion of dough and between the downwardly extending protrusions.

10. A method of forming dough, comprising the steps of:
    conveying the dough on a conveyor surface that moves continuously at a substantially constant rate beneath a dough forming element;
    moving the dough forming element downward into contact with the dough, while the conveyor surface is moving downstream relative to the dough forming element;
    moving the dough forming element downstream together with the conveyor surface while the dough forming element is in contact with the conveyor surface;
    moving the dough forming element upward out of contact with the formed dough; and
    returning the dough forming element upstream.

11. A method according to claim 10, further comprising the step of disposing a relatively rigid support surface beneath the dough forming element and the conveyor surface.

12. A method according to claim 11, further comprising the steps of:
    moving the support surface downstream together with the conveyor surface and the dough forming element between the steps of moving the dough forming element downward and upward relative to the conveyor surface; and
    returning the support surface upstream together with the dough forming element relative to the conveyor surface.

13. A method according to claims 12, further comprising the step of supporting the dough forming element and the support surface on a common linear bearing assembly.

14. A method according to claim 10, wherein a sheet of dough is conveyed on the conveyor surface, and the dough forming element cuts a desired portion of dough from the sheet of dough when moved into contact with the conveyor surface.

15. A method according to claim 10, further comprising the step of heating portions of the dough forming element to a temperature sufficiently high to deactivate yeast in the dough upon contact therewith, wherein the heated portions contact a portion of the dough when the dough forming element is moved into contact with the conveyor surface.

16. A method of forming dough into a desired configuration, comprising the steps of:
    positioning the dough on a surface beneath a dough forming element;

heating downwardly extending protrusions on the dough forming element to a temperature sufficiently high to deactivate yeast in the dough upon contact therewith;

moving the dough forming element downward into contact with the dough and thereby causing a portion of the dough to rise above another portion of the dough and into contact with the downwardly extending protrusions, thereby forming the desired configuration; and moving the dough forming element upward out of contact with the formed dough.

17. A method according to claim 16, wherein the dough on the surface is conveyed beneath the dough forming element.

18. A method of forming dough, comprising the steps of:

positioning the dough between a support surface and a dough forming element;

heating fins on the dough forming element to a temperature sufficiently high to deactivate yeast in the dough upon contact therewith; and pressing the dough between the dough forming element and the surface and thereby causing a portion of the dough to move relative to another portion of the dough and into contact with the heated fins.

19. A method according to claim 18, further comprising the step of moving the dough forming element away from the surface and out of contact with the formed dough.

20. A method according to claim 18, wherein the surface is disposed beneath the dough forming element, and the step of pressing the dough includes movement of the dough forming element downward into contact with the surface.

21. A method according to claim 18, wherein the dough is conveyed between the support surface and the dough forming element.

22. A method of forming dough, comprising the steps of:

manipulating the dough into a sheet having a peripheral lip;

heating fins to a temperature sufficiently high to deactivate yeast in the dough upon contact therewith; and moving the heated fins into contact with the peripheral lip to form a pizza crust.

23. A method according to claim 22, wherein the steps of manipulating the dough into the sheet having the peripheral lip and moving the heated fins into contact with the peripheral lip are performed contemporaneously.

24. A method according to claim 22, wherein the step of manipulating the dough into a sheet having a peripheral lip involves pressing the dough so that a peripheral portion of the dough rises above a central portion of the dough.

25. A method according to claim 24, wherein the step of pressing the dough causes the peripheral portion to contact the heated fins.

* * * * *